United States Patent
Koga et al.

(10) Patent No.: US 6,505,139 B1
(45) Date of Patent: Jan. 7, 2003

(54) SPEED RATIO CONTROL DEVICE FOR VEHICLE

(75) Inventors: Masato Koga, Atsugi (JP); Mitsuru Watanabe, Hadano (JP); Satoshi Takizawa, Yokohama (JP); Masatoshi Akanuma, Fujisawa (JP); Shigeki Shimanaka, Hadano (JP); Hiroyasu Tanaka, Zama (JP); Junya Takayama, Oomiya (JP)

(73) Assignee: Nissan Motor Co., Ltd., Yokohama (JP)

( * ) Notice: Subject to any disclaimer, the term of this patent is extended or adjusted under 35 U.S.C. 154(b) by 60 days.

(21) Appl. No.: 09/672,985

(22) Filed: Sep. 29, 2000

(30) Foreign Application Priority Data

Sep. 30, 1999 (JP) .............................. 11-280362
Sep. 30, 1999 (JP) .............................. 11-280366

(51) Int. Cl.[7] ................................. G01P 3/00
(52) U.S. Cl. ........................ 702/148; 701/51; 701/69; 477/34; 477/36
(58) Field of Search ................. 702/148, 142, 702/145; 477/43, 120, 48, 49, 904, 36, 39, 40, 34; 701/1, 51, 53, 69

(56) References Cited

U.S. PATENT DOCUMENTS

| 5,036,730 A | * | 8/1991 | Sakai et al. ............... 477/121 |
| 5,152,191 A | | 10/1992 | Sato et al. ................... 74/844 |
| 5,178,044 A | | 1/1993 | Suzuki et al. ............... 74/866 |
| 5,431,241 A | | 7/1995 | May et al. .................. 180/197 |
| 6,157,884 A | * | 12/2000 | Narita et al. ................. 477/34 |

FOREIGN PATENT DOCUMENTS

| EP | 0 531 552 | 3/1993 |
| JP | 4-64764 | 2/1992 |

* cited by examiner

Primary Examiner—Kamini Shah
Assistant Examiner—Hien Vo
(74) Attorney, Agent, or Firm—Foley & Lardner

(57) ABSTRACT

The vehicle comprises a continuously variable transmission and traction control system (TCS) which controls a driving force. When the TCS is not operating, a controller computes a final target ratio based on a sensor detected vehicle speed. When the TCS is operating, the final target ratio is computed based on an estimated vehicle speed, and the final target ratio is limited by a speed ratio upper limiting value computed based on the sensor detected vehicle speed. The controller controls a speed change actuator so that a real speed ratio approaches the final target ratio.

6 Claims, 9 Drawing Sheets

SPEED RATIO CONTROL DEVICE FOR VEHICLE

FIELD OF THE INVENTION

The present invention relates to speed change control for a vehicle with a continuously variable transmission (CVT), and especially to speed change control during operation of a traction control system.

BACKGROUND OF THE INVENTION

When a traction control system (TCS) which suppresses tire slip by decreasing the driving force operates, a driving force changes, and a driving wheel speed fluctuates. Therefore, when a final target ratio is computed based on the driving wheel speed during traction control and speed ratio control is performed so that a real speed ratio approaches the final target ratio, the real speed ratio will fluctuate.

To prevent such a fluctuation, JP-A-H4-64764 published by the Japanese Patent Office in 1992 discloses a technique where the final target ratio is computed not based on driving wheel speed but based on an estimated vehicle speed, for example the driven wheel speed during operation of the TCS.

SUMMARY OF THE INVENTION

However, when the TCS operates, and speed ratio control is performed based on the driven wheel speed, although the above fluctuation is stopped, the driven wheel speed becomes smaller than the driving wheel speed as shown in FIG. 9, so it is difficult to perform an up-shift (speed change which makes the speed ratio small) compared with the case where driving wheel speed is used for speed ratio control.

When an up-shift becomes hard to perform, the engine rotation speed increases Moreover, if the driving wheels slip and the driving wheel speed increases, the rotation speed of the engine may increase too much.

It is therefore an object of this invention to prevent the engine rotation speed increasing excessively while suppressing speed ratio fluctuation during operation of a traction control system.

In order to achieve above object this invention provides a speed ratio control device for a vehicle comprising a continuously variable transmission and traction control system which controls a driving force. The device comprises a sensor which detects a vehicle speed, an actuator which changes the speed ratio of the transmission, and a microprocessor programmed to estimate a vehicle speed based on a running state, compute the target ratio of the transmission based on the sensor detected speed when the traction control system is not operating, compute the target ratio of the transmission based on the estimated vehicle speed, and limit the computed target ratio to a speed ratio upper limiting value computed based on the sensor detected vehicle speed, when the traction control system is operating, and control the actuator so that the speed ratio of the transmission approaches the target ratio.

The details as well as other features and advantages of this invention are set forth in the remainder of the specification and are shown in the accompanying drawings.

DESCRIPTION OF THE PREFERRED EMBODIMENTS

Figure 1:
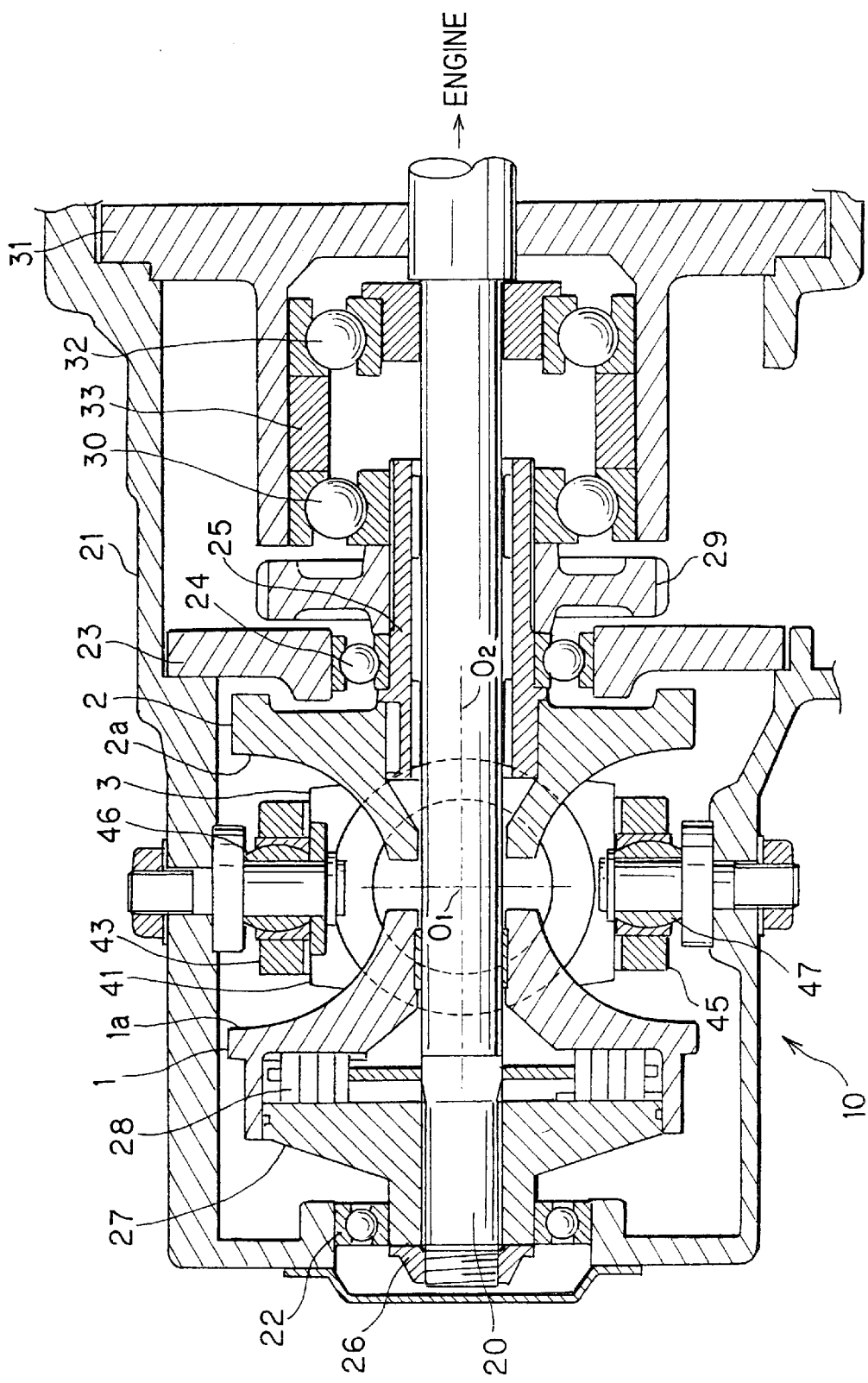
FIG. 1 is a longitudinal cross-sectional view of a toroidal continuously variable transmission according to this invention.

Referring to FIG. 1 of the drawings, a toroidal continuously variable transmission (CVT) 10 according to this invention comprises an input shaft 20 connected to an engine, not shown, via a torque converter. One end of the input shaft 20 is supported by a bearing 22 in a transmission case 21, and the middle is supported via a bearing 24 and a hollow output shaft 25 in an intermediate wall 23 of the transmission case 21.

An input disk 1 is supported by the input shaft 20. An output disk 2 is supported by the output shaft 25. The input disk 1 and output disk 2 are arranged so that their toroidal curved surfaces 1a, 2a face each other.

A pair of power rollers 3 disposed on either side of the input shaft 20 are gripped between the surfaces 1a and 2a.

In order to grip the power rollers 3 between the input disk 1 and output disk 2, a nut 26 is tightened at the tip of the input shaft 20. The nut 26 is tightened so that a cam disk 27 does not fall out of the input shaft 20. Cam rollers 28 are provided between the cam disc 27 and the input disk 1. The rotation of the input shaft 20 is transmitted to the input disk 1 via the cam rollers 28.

The rotation of the input disk 1 is transmitted to the output disk 2 via the power rollers 3. The cam rollers 28 generate a thrust force proportional to the transmitting torque, and grip the power rollers 3 between the input disk 1 and output disk 2.

The output disk 2 is spline jointed to the output shaft 25. An output gear 29 is fixed on the output shaft 25.

The output shaft 25 is supported by a cover 31 of the transmission case 21 via a radial thrust bearing 30. The input shaft 20 is supported by the cover 31 via a radial thrust bearing 32. The bearings 30, 32 cannot approach each other due to a spacer 33. Further, the bearings 30, 32 respectively contact an output gear 29 and the input shaft 20, and cannot move away from each other.

Therefore, the thrust force which acts on the input disk 1 and the output disk 2 due to the cam rollers 28 is cancelled at the spacers 33, and does not act on the transmission case 21.

Figure 2:
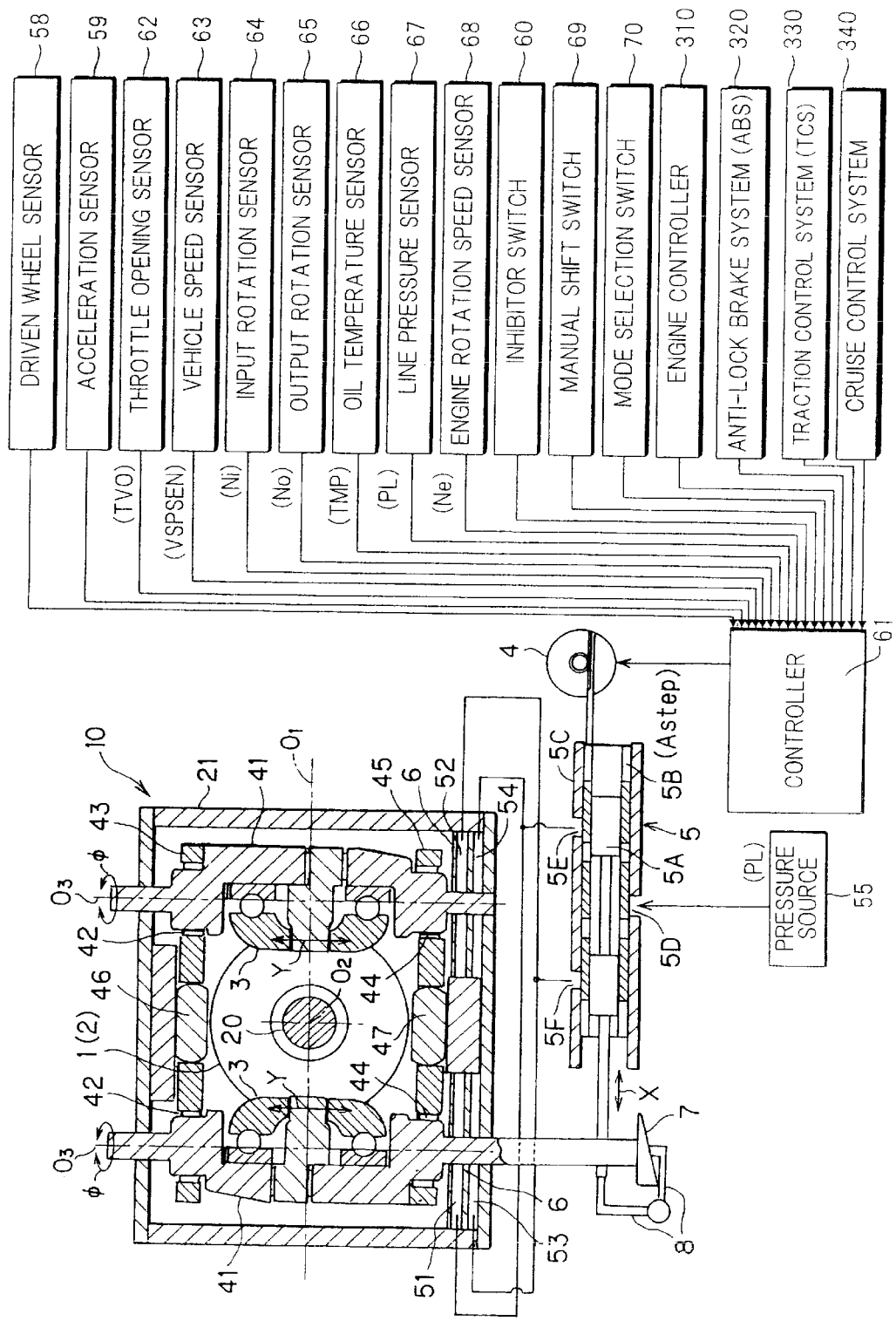
FIG. 2 is a transverse cross-sectional view of the transmission, and a schematic diagram of a speed ratio control device.

The power rollers 3 are supported free to rotate by trunnions 41, as shown in FIG. 2. The upper ends of the trunnions 41 are joined to an upper link 43 via a spherical joint 42 so that they are free to rotate and free to pivot, and their lower ends are joined to a lower link 45 via a spherical joint 44 so that they are free to rotate and free to pivot.

The upper link 43 and the lower link 45 are supported with their centers free to pivot on spherical joints 46, 47, and the trunnions 41 can be displaced vertically in synchronism in mutually opposite directions.

The speed ratio control device of the aforesaid transmission 10 will now be described referring to FIG. 2.

A piston 6 for displacing the trunnions 41 in a vertical direction is provided at each turnnion 41. Upper chambers 51, 52 and lower chambers 53, 54 are respectively formed on either side of these pistons 6. A speed ratio control valve 5 for controlling the displacement of each piston 6 is provided.

The speed ratio control valve 5 comprises a spool 5A, sleeve 5B and valve case 5C. The spool 5A and sleeve 5B fit together so that they are flee to slide relative to each other. The sleeve 5B fits in the valve case 5C so that they are free to slide relative to each other.

A port 5D of the speed ratio control valve 5 is connected to a pressure source 55. A port 5E of the speed ratio control valve 5 is connected to the piston chambers 51, 54. A port 5F is connected to the piston chambers 52, 53.

The spool 5A operates together with a precess cam 7 fixed to the lower end of one of the trunnions 41 via a link 8. The sleeve 5B is engaged with a step motor 4 by a rack and pinion.

An operating command to the speed ratio control valve 5 is supplied as a displacement to the outer sleeve 5B by the step motor 4.

If the sleeve 5B displaces from the neutral position relative to the spool 5A due to this operating command, for example to the position shown in FIG. 2, the speed ratio control valve 5 will open, a fluid pressure (line pressure PL) will be supplied to the chambers 52, 53 from the pressure source 55, and the other chambers 51, 54 will be drained. The trunnions 41 then displace in mutually opposite directions up and down due to the pistons 6.

On the other hand, if the sleeve 5B displaces from the neutral position relative to the spool 5A in the reverse direction, the speed ratio control valve 5 will open, a fluid pressure will be supplied to the chambers 51, 54 from the pressure source 55, and the other chambers 52, 53 will be drained. The trunnions 41 then displace in mutually opposite directions up and down due to the pistons 6, 6.

As a result, the power rollers 3 are offset from the position where the rotation axis shaft $O_1$ intersects the rotation axis $O_2$ of the disks 1 and 2. The offset power rollers 3 receive a force from the disks 1 and 2, and gyrate around the rotation axis $O_3$ which is perpendicular to the axis $O_1$ so as to realize continuous variable speed change.

The precess cam 7 provided on a lower end of one of the trunnions 41 performs mechanical feedback of an offset Y and gyration angle Φ of the trunnion 41 and power roller 3 as a displacement X of the spool 5A via the link 8.

When a speed ratio command value corresponding to a command value Astep to the step motor 4 is achieved by a continuously variable speed change, the spool 5A is returned to the neutral position relative to the sleeve 5B by the aforesaid mechanical feedback. Simultaneously, the power rollers 3 are returned to a position where the rotation axis $O_1$ intersects the rotation axis $O_2$ of the disks 1 and 2, thereby maintaining the aforesaid speed ratio command value.

In order to make the oration angle Φ of the power roller 3 a value corresponding to the speed ratio command value, it is sufficient for the precess cam 7 to feed back the gyration angle Φ of the power roller 3. However, in order to prevent the speed ratio control from hunting, the offset Y of the power roller 3 is also fed back.

The command value Astep to the step motor 4 is determined by the controller 61.

The controller 61 comprises a microprocessor, read only memory, random access memory and input/output interface, and the following signals are input to the controller 61 as shown in FIG. 2.

driven wheel speed signal from a driven wheel speed sensor 58 acceleration signal from an acceleration sensor 59 throttle opening signal TVO from a throttle opening sensor 62 sensor detected vehicle speed signal VSPSEN from a vehicle speed sensor 63 transmission input rotation speed signal Ni (or engine rotation speed signal Ne) from an input rotation sensor 64 transmission output rotation speed signal No from an output rotation sensor 65 transmission oil temperature signal TMP from an oil temperature sensor 66 line pressure signal PL from a line pressure sensor 67 engine rotation speed signal Ne from an engine rotation speed sensor 68 shift lever position signal from an inhibitor switch 60 up-shift signal and down-shift signal from a manual shift switch 69 selected mode signal from a mode selection switch 70 torque-down signal from an engine controller 310 signal showing an operating state of an anti-lock brake system (ABS) 320 from the anti-lock brake system 320 signal showing an operating state of a traction control system (TCS) 330 from the traction control system 330.

auto-cruise signal from a cruise control system 340

Here, as the line pressure PL is controlled by the controller 61, it is usually detected from an internal signal of the controller 61. The vehicle speed sensor 63 detects the vehicle speed from a rotation speed of, for example, the output shaft of the transmission 10, a drive shaft or a driving wheel.

The controller 61 computes the command value Astep to the step motor 4 on the basis of the aforesaid input signals.

Figure 3:
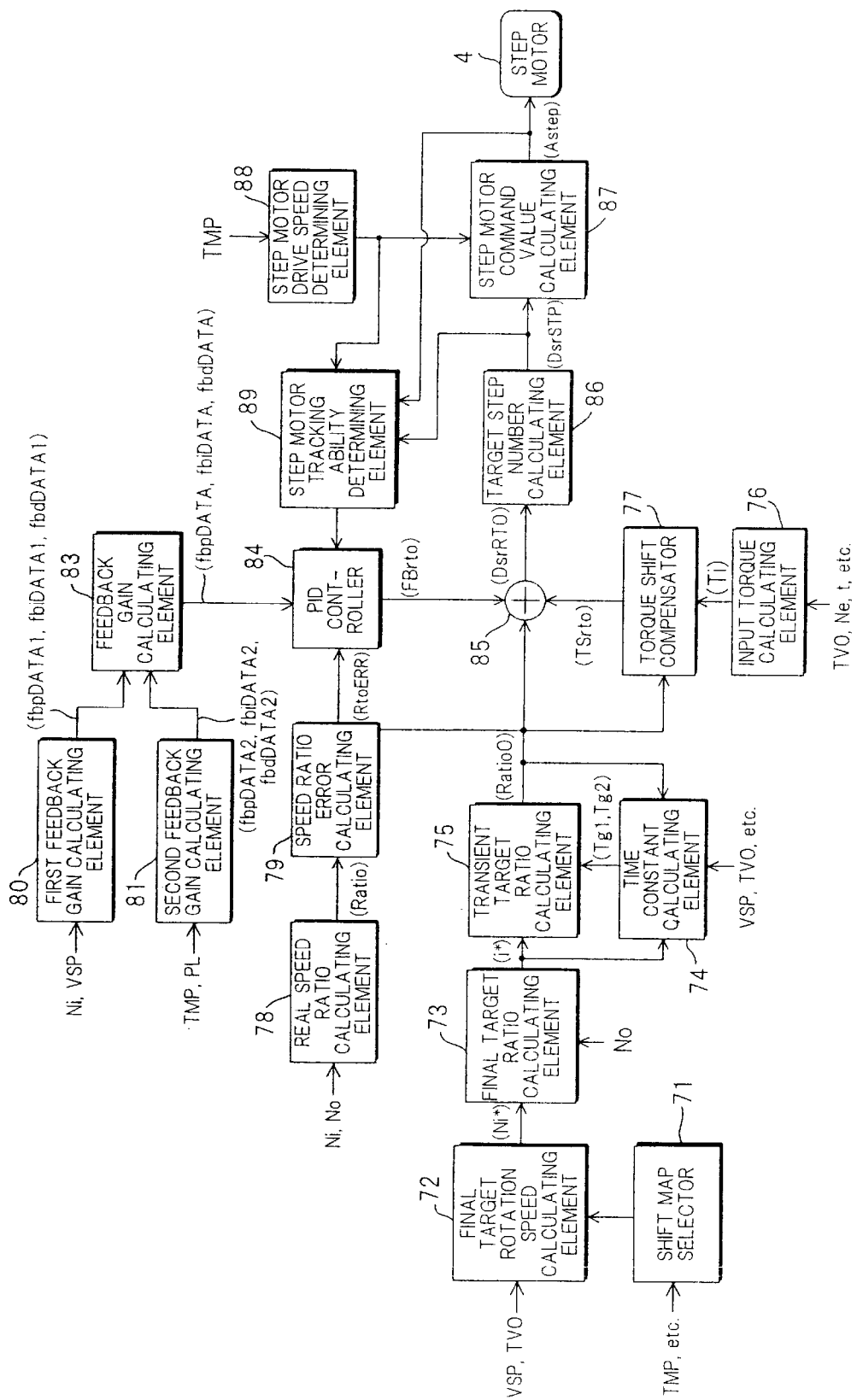
FIG. 3 is a block diagram of a controller of the speed ratio control device.

The controller 61 comprises the elements shown in FIG. 3. These elements actually comprise a computer program stored by the memory of the controller 61 or an electronic circuit of the controller 61.

Figure 4:
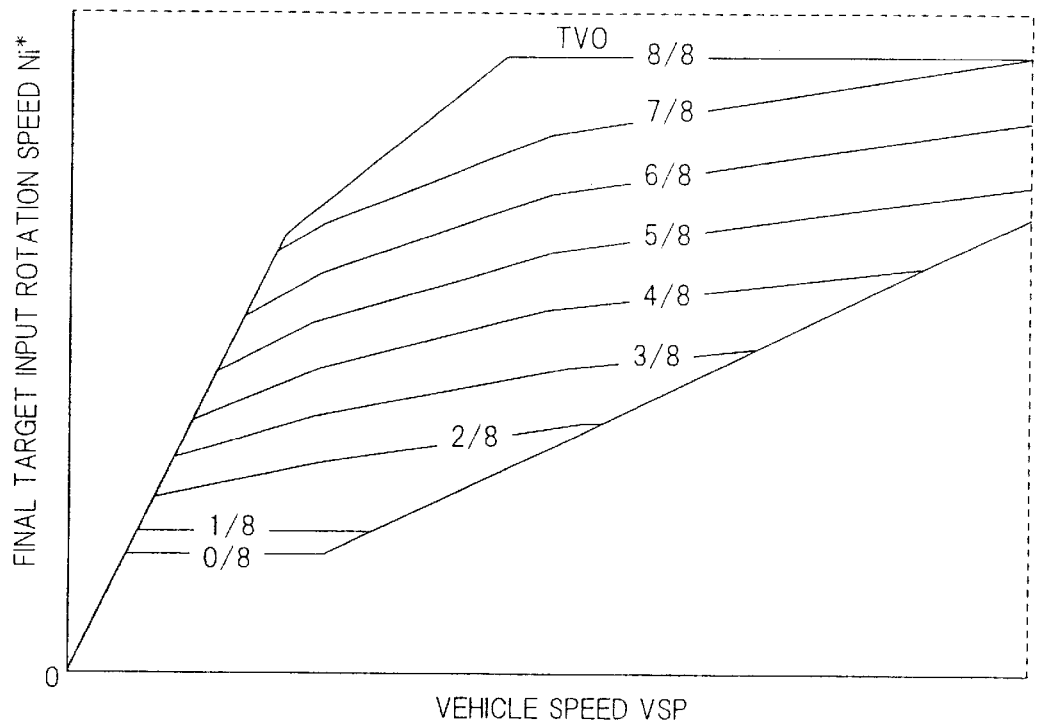
FIG. 4 is an example of a shift map used for speed change ratio control.

A shift map selector 71 selects a map to be used from among plural pre-prepared maps depending on the transmission oil temperature TMP, and whether or not an exhaust gas purification catalyst has activated. FIG. 4 is an example of a shift map.

A final target input rotation speed calculating element 72 calculates a final target input rotation speed W by looking up the shift map shown in FIG. 4 based on the throttle opening TVO and vehicle speed VSP. The final target rotation speed Ni* is the target value of the input rotation speed in the steady running state.

Here, when the ABS 320 and the TCS 330 are not operating, a value VSPSEN detected by the vehicle speed sensor 63 is used as the vehicle speed VSP, and when these systems are operating, an estimated vehicle speed described hereafter VSPFL is used as the vehicle speed VSP.

A final target ratio calculating element 73 calculates a final target ratio i* by dividing the final target input rotation speed Ni* by the transmission output rotation speed No. The final target ratio i* is the target value of the speed ratio in the steady running state.

A time constant calculating element 74 determines a first speed change time constant Tg1 and second speed change time constant Tg2 used in speed change control according to the shift lever position (the normal running position "D" or sports running position "Ds", etc.), vehicle speed VSP, throttle opening TVO, engine rotation speed Ne, accelerator pedal depression rate, the torque-down signal, the anti-lock brake control signal, the traction control signal, the auto-cruise signal, and a speed ratio difference RtoERR between the real speed ratio Ratio and a transient target ratio Ratio0 described later, and computes a difference Eip between the final target ratio i* and transient target ratio Ratio0.

The first speed change time constant Tg1 and second speed change time constant Tg2 which are determined corresponding to a second order delay of the toroidal CVF 10, determine the speed change response relative to the final target ratio i*, and determine a speed change rate.

A transient target ratio calculating element 75 computes the transient target ratio Ratio0 and an intermediate speed ratio Ratio00 for bringing a real speed ratio Ratio close to the final target ratio i* with a speed response defined by the first speed change time constant Tg1 and second speed change time constant Tg2, and outputs the transient target ratio Ratio0.

An input torque calculating element 76 calculates a transmission input torque Ti. First, the input torque calculating element 76 calculates the engine output torque based on the throttle opening TVO and engine rotation speed Ne. Next, a torque ratio t of the torque converter is found based on the ratio of the input rotation speed (=Ne) and output rotation speed (=Ni) of the torque converter. Finally, the output torque of the engine is multiplied by the torque ratio t to compute the transmission input torque Ti.

A torque shift compensator 77 computes a compensation amount TSrto for compensating a torque shift (speed ratio deviation) peculiar to a toroidal CVT based on the transient target ratio Ratio0 and input torque Ti of the transmission 10.

During torque transmission, the power rollers 3 are gripped between the input disk 1 and output disk 2, so the trunnions 41 deform. Due to this deformation, the position of the precess cam 7 provided on the lower end of the trunnion 41 varies, and the characteristics of the mechanical feedback system comprising the precess cam 7 and link 8 vary resulting in the aforesaid torque shift.

As the torque shift of the toroidal CVT differs according to the transient target ratio Ratio0 and transmission input torque Ti, the torque shift compensator 77 calculates the torque shift compensation amount TSrto by looking up a predetermined two-dimensional map based on the transient target ratio Ratio0 and transmission torque Ti.

A real speed ratio calculating element 78 computes the real speed ratio Ratio by dividing the transmission input rotation speed Ni by the transmission output rotation speed No. A speed ratio error calculating element 79 subtracts the real speed ratio Ratio from the transient target ratio Ratio0 to compute the speed ratio error RtoERR (=Ratio0−Ratio).

A fist feedback gain calculating element 80 computes a first proportional control feedback gain fbpDATA1, a first integral control feedback gain fbiDATA1 and a first differential control feedback gain fbdDATA1 according to the transmission input rotation speed Ni and vehicle speed VSP. The first feedback gains fbpDATA1, fbiDATA1 and fbd-DATA1 are used when a feedback correction amount FBrto is computed by PID control described later.

The first feedback gains fbpDATA1, fbiDATA1 and fbd-DATA1 are computed by looking up a predetermined two dimensional map based on the transmission input rotation speed Ni and vehicle speed VSP.

A second feedback gain calculating element 81 computes a second proportional control feedback gain fbpDATA2, a second integral control feedback gain fbiDATA2 and a second differential control feedback gain fbdDATA2 according to the oil temperature TMP and line pressure PL of the transmission 10. The feedback gains fbpDATA2, fbiDATA2 and fbdDATA2 are also used when the feedback correction amount FBrto is computed by PID control, described later.

The second feedback gains fbpDATA2, fbiDATA2 and fbdDATA2 are computed by looking up a two dimensional map based on the transmission oil temperature TMP and the line pressure PL.

A feedback gain calculating element 83 multiplies corresponding first feedback gains and second feedback gains so as to compute a proportional control feedback gain fbp-DATA (=fbpDATA1×fbpDATA2), an integral control feedback gain fbiDATA (=fbiDATA1×fbiDATA2), and a differential control feedback gain fbdDATA (=fbdDATA1× fbdDATA2.

A PID controller 84 computes a feedback correction amount by proportional control (=RtoERR×fbpDATA), a feedback correction amount by integral control (=∫{RtoERR×fbiDATA}), and a feedback correction amount by differential control (=(d/dt){RtoERR× fbdDATA}). These three feedback correction amounts are then added to compute the feedback correction amount FBrto (=RtoERR×fbpDATA+∫{RtoERR×fbiDATA}+(d/dt) {RtoERR×fbdDATA}) under PID control.

A transient target ratio corrector 85 corrects the transient target ratio Ratio0 by the torque shit compensation amount TSrto and the speed ratio feedback correction amount FBrto, and computes a compensated transient target ratio DsrRT0 ('Ratio0+TSrto+FBrto).

A target step number calculating element 86 computes a target step number DsrSTP of the step motor 4 which realizes the compensated transient target ratio DsrRT0 by looking up a predetermined map.

When the step motor 4 cannot displace to the aforesaid target step number DsrSTP during one control cycle even at the maximum drive speed of the step motor 4 determined according to the transmission oil temperature TMP by a step motor drive speed determining element 88, a step motor command value calculating element 87 takes a position which can be realized at the maximum drive speed of the step motor 4 as the command value Astep to the step motor 4. On the other hand, when the step motor 4 can displace to the aforesaid target step number DsrSTP during one control cycle, the target step number DsrSTP is set to the command value Astep to the step motor 4.

Therefore, it can be considered that command value Astep is the actual position of the step motor 4.

The step motor 4 rotates in the direction and position corresponding to the command value Astep, displaces the sleeve 5B of the speed ratio control valve 5 by the rack and pinion, and changes the speed ratio of the CVT 10.

When the speed ratio corresponding to the command value Astep is attained, the spool 5A is returned to the neutral position relative to the sleeve 5B by mechanical feedback via the precess cam 7. Simultaneously, the power rollers 3 are returned to the position at which the rotation axis $O_1$ intersects the rotation axis $O_2$ of the disks 1 and 2. Thereby, the speed ratio command value is maintained.

A step motor tracking ability determining element 89 determines whether or not the step motor 4 can follow the target step number DsrSTP corresponding to the compensated transient target ratio DsrRT0. First, the determining element 89 calculates a step number difference ΔSTP between the target step number DsrSTP and the command value Astep which can be considered as the actual position. When the step number error ΔSTP is smaller than a value ΔSTPLIM which the step motor 4 can eliminate during one control cycle at the maximum drive speed of the step motor 4 determined as described above by the step motor drive speed determining element 88 (ΔSTP<ΔSTPLIM), the determining element 89 determines that the step motor 4 can follow the target step number DsrSTP corresponding to the compensated transient target ratio DsrRT0. Conversely, when the step number error ΔSTP is larger than the value ΔSTPLIM (ΔSTP>ΔSTPLIM), it determines that the step motor 4 cannot follow the target step number DsrSTP.

When it is determined that the step motor 4 can follow the target step number DsrSTP corresponding to the compensated transient target ratio DsrRT0, the determining element 89 commands the PID controller 84 to continue the computing of the speed ratio feedback correction amount FBrto by the aforesaid PID control. On the other hand, when it is determined that the step motor 4 cannot follow the target step number DsrSTP, the determining element 89 commands the PID controller to maintain the speed ratio feedback correction amount $f\{EtoERR \times fbiDATA\}$ by integral control at its value at the time of the determination.

In the step motor command value calculating element 87, when the step motor 4 cannot displace to the target step number DsrSTP during one control cycle even at the maximum drive speed of the step motor 4, the position which can be realized at the maximum drive speed of the step motor 4 is taken as the command value Astep, and the command value Astep is used for the step motor tracking ability determination by the determining element 89 as the real position of the step motor 4. Hence, it is possible to know the real position of the step motor 4 when the tracking ability determination is performed from the command value Astep to the step motor 4. For this reason, it is unnecessary to actually detect the position of the step motor 4 to perform the tracking ability determination.

Further, in the step motor tracking ability determining element 89, when the step number error ΔSTF between the target step number DsrSTP and the actual drive position (=command value Astep) is smaller than the value ΔSTPLIM which is determined according to the maximum drive speed of the step motor 4 (ΔSTP<ΔSTPLIM), it is determined that the step motor 4 can follow the target step number DsrSTP corresponding to the compensated transient target ratio DsrRT0. Conversely, when the step number error ΔSTF is greater than the value ΔSTPLIM which is defined according to the maximum drive speed of the step motor 4 (ΔSTP>ΔSTPLIM), it is determined that the step motor 4 cannot follow the target step number DsrSTP. Thus, the determination of the tracking ability of the step motor 4 can be performed precisely although the maximum drive speed of the step motor 4 varies according to the oil temperature TMP, etc.

Next, the speed ratio control performed by the controller 61 will be described referring to FIGS. 5–7.

Figure 5:
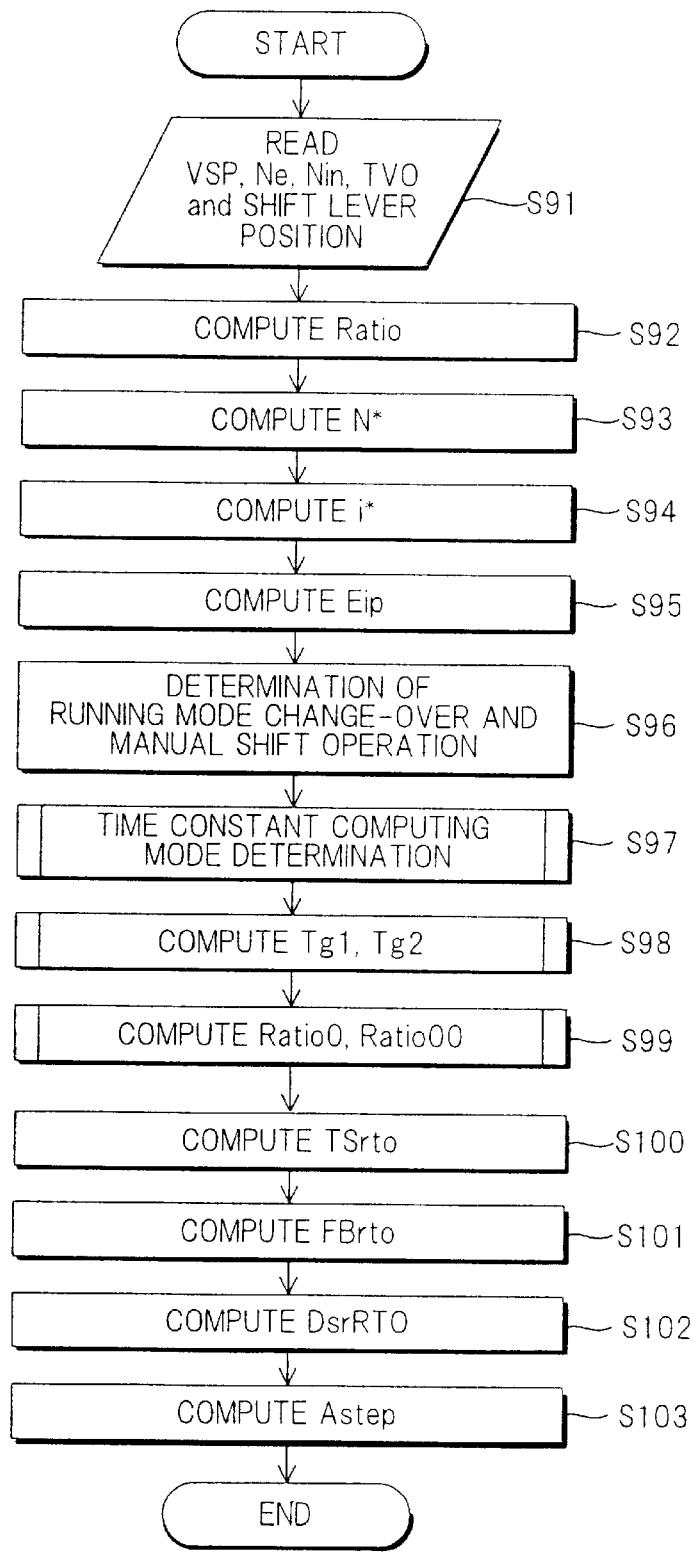
FIG. 5 is a flowchart for describing a main routine of speed change ratio control performed by the controller.

FIG. 5 shows the main routine of speed ratio control. This routine is performed at an interval of 10 milliseconds.

In a step S91, the vehicle speed VSP, engine rotation speed Ne, transmission input rotation speed Ni, throttle opening TVO and a shift lever position are read. The step S91 corresponds to processing of the time constant calculating element 74.

Here, when the ABS 320 and TCS 330 are not operating, the value VSPSEN detected by the vehicle speed sensor 63 is read as the vehicle speed VSP, and when these systems are operating, the estimated vehicle speed VSPFL described hereafter is read as the vehicle speed VSP.

In a step S92, the real speed ratio Ratio is computed by dividing the input rotation speed Ni by the transmission output rotation speed No. The step S92 corresponds to processing by the final target input rotation speed calculating element 72.

In a step S93, the final target input rotation speed Ni* is computed based on the throttle opening TVO and vehicle speed VSP by looking up the map shown in FIG. 4. The step S93 corresponds to processing by the shift map selector 71 and the final target input rotation speed calculating element 72.

In a step S94, the final target ratio i* is computed by dividing the final target input rotation speed Ni* by the transmission output rotation speed No. The step S94 corresponds to processing by the final target ratio calculating element 73.

In a step S95, the difference Eip is computed by subtracting the transient target ratio Ratio0 computed on the immediately preceding occasion the routine was performed (this is computed at the next step S99) from the final target ratio i*. The step S95 corresponds to processing by the time constant calculating element 74.

In a step S96, it is determined whether or not there has been a running mode change-over, or a manual shift operation. Specifically, it is detected whether or not there is a change-over between a power mode and a snow mode according to the signal from a mode selection switch 70. It is detected whether the shift lever is in the manual mode according to the signal from the inhibitor switch 60, and whether an upshift signal or downshift signal is detected from a manual shift switch 69. The step S96 also corresponds to processing by the time constant calculating element 74.

In steps S97, 98 and 99, the time constant computing mode is determined, and the first and second speed change time constants Tg1, Tg2, the transient target ratio Ratio0 and the intermediate speed ratio Ratio00 are computed, respectively. The steps S97, 98 and 99 also correspond to processing by the time constant calculating element 74.

In a step S100, the torque shift compensation amount TSrto is computed based on the transient target ratio Ratio0 and the transmission input torque Ti. The step S100 corresponds to processing by the torque shift compensator 77.

In a step S101, the feedback correction amount FBrto is computed by PID control. The step S101 corresponds to processing by the PID controller 84.

In a step S102, the torque shift compensation amount TSrto and feedback correction amount FBrto are added to the transient target ratio Ratio0 to compute the compensated transient target ratio DsrRT0. The step S102 corresponds to processing by the transient target ratio collector 85.

In a step S103, the command value Astep to the step motor 4 is computed. The step S103 corresponds to processing by the target step number calculating element 86 and the step motor command value calculating element 87.

Figure 6:
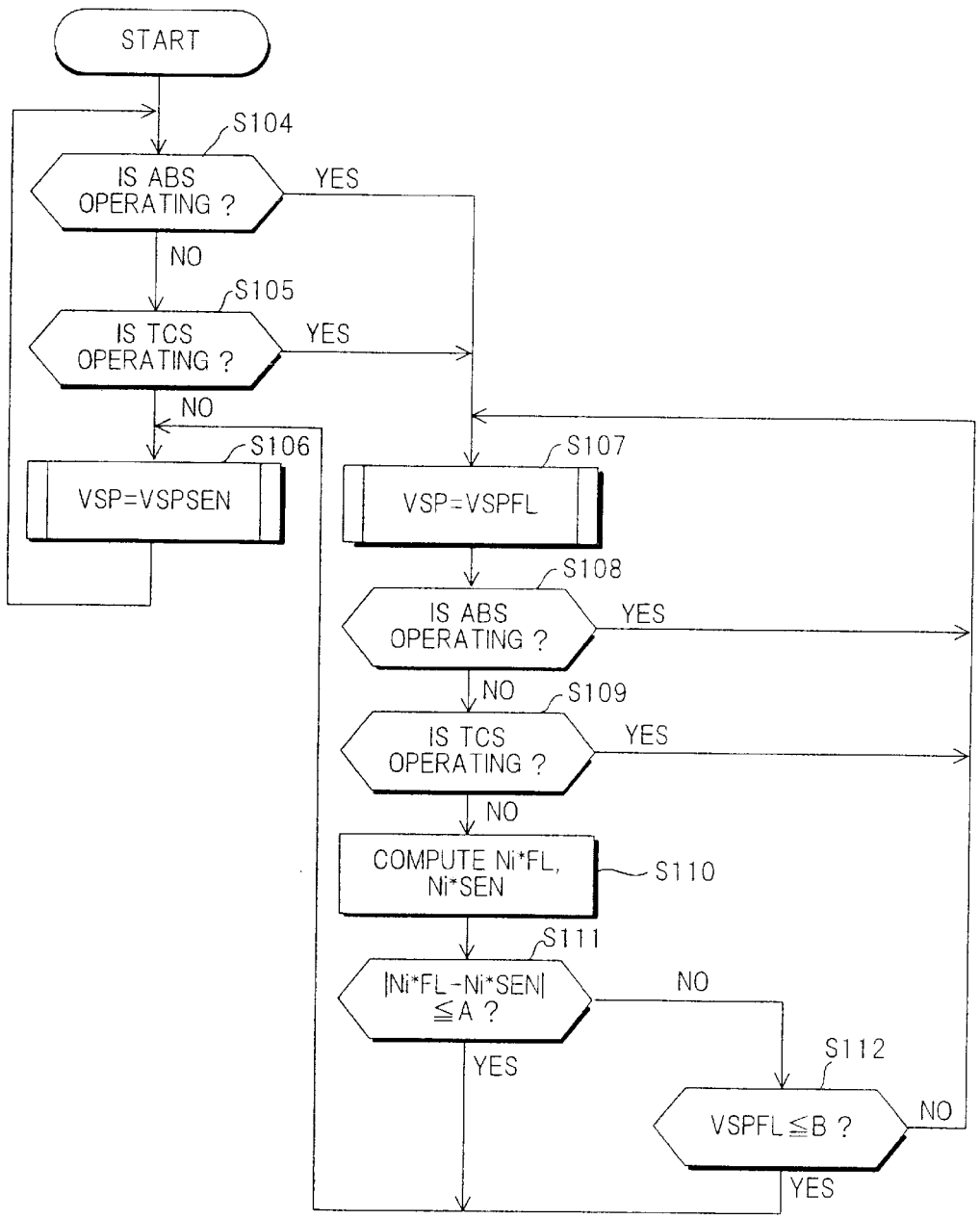
FIG. 6 is a flowchart describing a subroutine which determines a vehicle speed used for speed ratio control.

FIG. 6 shows a subroutine which determines the vehicle speed VSP used for speed ratio control. This routine corresponds to processing by the final target input rotation sped calculating element 72.

First, in a step S104, it is determined whether or not the ABS 320 is operating based on the s from the ABS 320. If it is determined that it is not operating, the routine proceeds to a step S105, and if it is determined that it is operating, the routine proceeds to a step S107.

In a step S105, it is determined whether or not the TCS 330 is operating based on the signal from the TCS 330. If it is determined that it is not operating, the routine proceeds to a step S106, and if it is determined that it is operating, the routine proceeds to the step S107.

In the step S106, the vehicle speed VSPSEN detected by the vehicle speed sensor 63 is set as the vehicle sped VSP used for speed ratio control, and the routine returns to the step S104.

In the step S107, the estimated vehicle speed VSPFL is set as the vehicle speed VSP used for sped ratio control, and the routine proceeds to a step S108. Here, the estimated vehicle speed VSPFL is a value obtained from the driven wheel speed detected by the driven wheel speed sensor 58. The estimated vehicle speed VSPFL may also be obtained by integrating the vehicle acceleration detected by the acceleration sensor 59.

In the step S108, it is determined whether or not the ABS 320 is operating based on the signal from the ABS 320. When it is determined that it is not operating, the routine proceeds to a step S109, and when it is determined that it is operating, the routine proceeds to the step S107.

In the step S109, it is determined whether or not the TCS 330 is operating based on the signal from the TCS 330. If it is determined that it is not operating, the routine proceeds to a step S110, and if it is determined that it is operating, the routine proceeds to the step S107.

In the step S110, the final target input rotation speed Ni*FL is computed by looking up the map shown in FIG. 4 based on the throttle opening TVO and estimated vehicle speed VSPFL. Further, a final target input rotation speed Ni*SEN is computed by looking up the map shown in FIG. 4 based on the throttle opening TVO and the sensor detected vehicle speed VSPSEN.

In a step S111, it is determined whether or not the difference between the final target input rotation speed Ni*FL computed using the estimated vehicle speed VSPFL and the final target input rotation speed Ni*SEN computed using the sensor detected vehicle speed VSPSEN, is smaller than a predetermined threshold A. The maximum speed ratio variation amount permissible for passengers when the speed ratio varies due to changing over the vehicle speed VSP used for speed ratio control from the estimated vehicle speed VSPFL to the sensor detected vehicle speed VSPSEN is found by experiment, etc., and the rotation speed variation which corresponds to this value is set to the threshold A.

If the difference is determined to be smaller than the threshold A in the step S111, the routine proceeds to the step S106, and the vehicle speed VSP used for speed ratio control is changed over from the estimated vehicle speed VSPFL to the sensor detected vehicle speed VSPSEN. If it is determined to be larger than the threshold A in the step S111, the routine proceeds to a step S112.

In the step S112, it is determined whether or not the estimated vehicle speed VSPFL is smaller than a predetermined value B. Here, the value set as the minimum value of the vehicle speed VSP used for speed ratio control (the lower limit of VSP) is set to the value B. If the estimated vehicle speed VSPFL is determined to be smaller than the predetermined value B in the step S112, the routine proceeds to the step S106, and the vehicle speed VSP used for speed ratio control is changed over from the estimated vehicle speed VSPFL to the sensor detected vehicle speed VSPSEN. If the estimated vehicle speed VSPFL is determined to be larger than the predetermined value B in the step S112, the routine proceeds to the step S107.

Therefore, when neither the ABS 320 nor the TCS 330 is operating, the sensor detected vehicle speed VSPSEN is set as the vehicle speed VSP used for speed ratio control. On the other hand, if either of the ABS 320 or the TCS 330 begins to operate, the vehicle speed VSP used for speed ratio control will be changed over from the sensor detected vehicle speed VSPSEN to the estimated vehicle speed VSPFL.

While the ABS 320 or TCS 330 is operating, the estimated vehicle speed VSPFL is used for speed ratio control. If the ABS 320 and the TCS 330 are not operating and the conditions of the step S111 or step S112 are satisfied, the vehicle speed VSP used for speed ratio control is changed over from the estimated vehicle speed VSPFL to the sensor detected vehicle speed VSPSEN.

Thus, when the ABS 320 or the TCS 330 are operating, as the estimated vehicle speed VSPFL is set as the vehicle speed VSP used for speed ratio control, the fluctuation due to speed ratio fluctuation of the sensor detected vehicle speed VSPSEN is stopped. Moreover, the speed ratio can be prevented from varying on the large side and encouraging slip.

As the change-over is performed after checking that the speed ratio does not vary abruptly when the vehicle speed VSP used for speed ratio control is changed over the from estimated vehicle speed VSPFL to the sensor detected vehicle speed VSPSEN, shocks are also prevented from occurring during the change-over.

Figure 7:
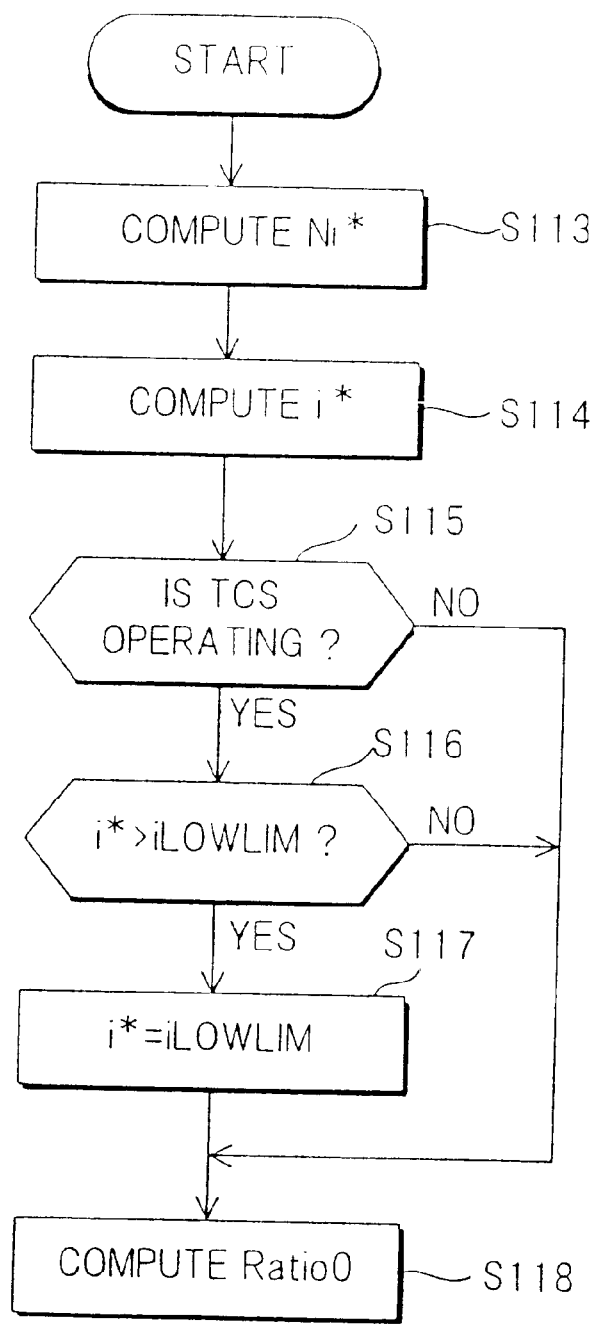
FIG. 7 is a flowchart describing a subroutine which computes a transient target ratio used for speed change control.

FIG. 7 shows a subroutine for computing the transient target ratio Ratio0. This routine corresponds to processing by the final target input rotation speed calculating element 72, final target ratio calculating element 73, and transient target ratio calculating element 75.

In a step S113, the final target input rotation speed Ni* is found by looking up the map shown in FIG. 4 based on the throttle opening TVO and vehicle speed VSP.

In a step S114, the final target ratio i* corresponding to the final target input rotation speed Ni* is computed by dividing the final target input rotation speed Ni* by the transmission output rotation speed No.

In a step S115, it is determined whether or not the TCS 330 is operating based on the signal from the TCS 330. If it is determined that it is not operating, the routine proceeds to a step S118, and if it is determined that it is operating, the routine proceeds to a step S116.

In the step S116, it is determined whether or not the final target ratio i* is larger than a speed ratio upper limiting value iLOWLIM computed based on the latest sensor detected vehicle speed VSPSEN which is detected when the step S116 is performed. If the final target ratio i* is larger than the speed ratio upper limiting value iLOWLIM, the routine proceeds to the step S117, and when the final target ratio i* is smaller than the speed ratio upper limiting value iLOWLIM, the routine proceeds to a step S118. Here, the speed ratio upper limiting value iLOWLIM is computed by looking up a preset map shown in FIG. 8.

In the step S117, the final target ratio i* is limited to the speed ratio upper limiting value iLOWLIM.

In the step S118, the transient target ratio Ratio0 is computed based on the final target ratio i*, the first speed change time constant Tg1 and the second speed change time constant Tg2.

Therefore, when the TCS 330 is operating, and when the final target ratio i* is larger than the speed ratio upper limiting value iLOWLIM set according to the sensor detected vehicle speed VSPSEN, the final target ratio i* is limited to the speed ratio upper limiting value iLOWLIM.

Moreover, when the TCS 330 is operating, the estimated vehicle speed VSPFL is used as the vehicle speed VSP when the final target ratio i* is computed, so speed ratio fluctuation due to fluctuation of the sensor detected vehicle speed VSPSEN is stopped even when the TCS is operating.

Figure 9:
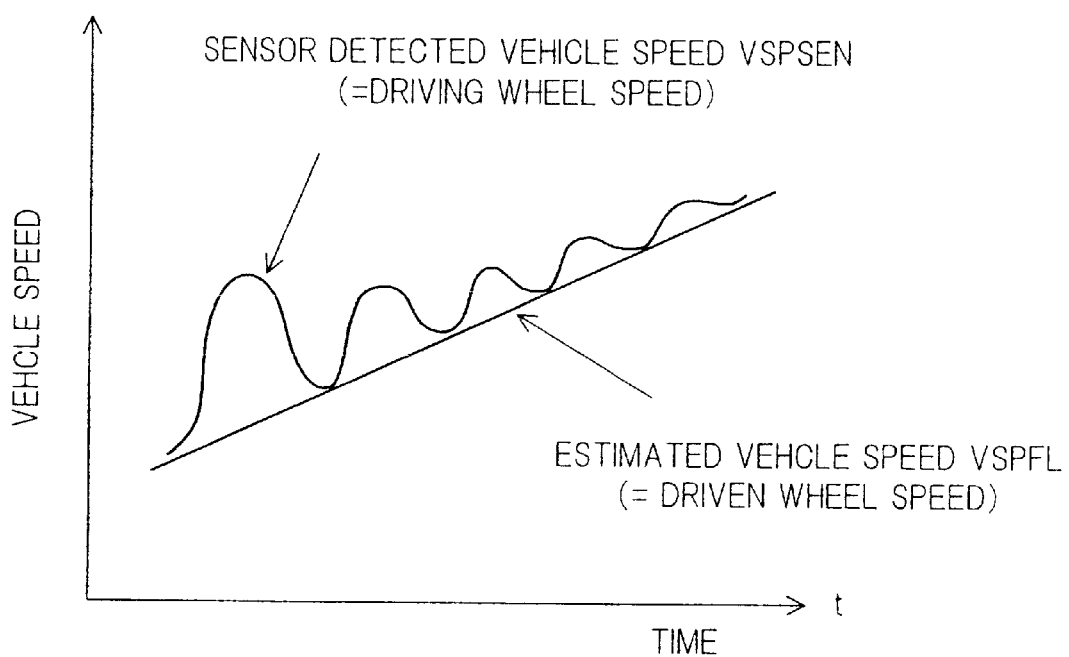
FIG. 9 is a time chart showing how a sensor detected vehicle speed (=driving wheel speed) and an estimated vehicle speed (=driven wheel speed) vary during operation of a traction control system.

If the estimated vehicle speed VSPFL is used for speed ratio control when the TCS 330 is operating the estimated vehicle speed VSPFL is smaller than the sensor detected vehicle speed VSPSEN as shown in FIG. 9, so an upshift becomes difficult to perform compared with the case where the sensor detected vehicle speed VSPSEN is used for speed ratio control. However, in this embodiment, as the final target ratio i* obtained using the estimated vehicle speed VSPFL when the TCS 330 is operating, is limited by the speed ratio upper limiting value iLOWLIM which is set according to the sensor detected vehicle speed VSPSEN, the engine rotation speed Ne is suppressed low even when the TCS 330 is operating.

Further, as the up-shift which is not subject to limitation by the speed ratio upper limiting value iLOWLIM can be performed when the driving wheels slip and the driving wheel speed increases, increase of the engine rotation speed Ne can be suppressed.

As described above, according to this invention, speed ratio fluctuation can be stopped by setting the vehicle speed VSP used for speed ratio control to the estimated vehicle speed VSPFL when the TCS 330 is operating. Moreover, as the upper value of the final target ratio i* is limited according to the sensor detected vehicle speed VSPSEN, excessive rise of the engine rotation speed can be suppressed.

Further, in the step S116, as the speed ratio upper limiting value iLOWLIM is calculated based on the latest sensor detected vehicle speed VSPSEN and the final target ratio i* is limited, a final tart ratio i* which does not increase the engine rotation speed Ne can be computed corresponding to the variation of the sensor detected vehicle speed VSPSEN. If for example the value read when the final target ratio i* is computed were used as the sensor detected vehicle speed VSPSEN in the step S116, as some time is required from when the sensor detected vehicle speed VSPSEN is read to when the final target ratio i* is limited, the sensor detected vehicle speed VSPSEN used to determine the speed ratio upper limiting value iLOWLIM is an old value, so it is no longer possible to adapt to the increase and decrease of the sensor detected vehicle speed VSPSEN during the operation of the TCS 330.

Figure 8:
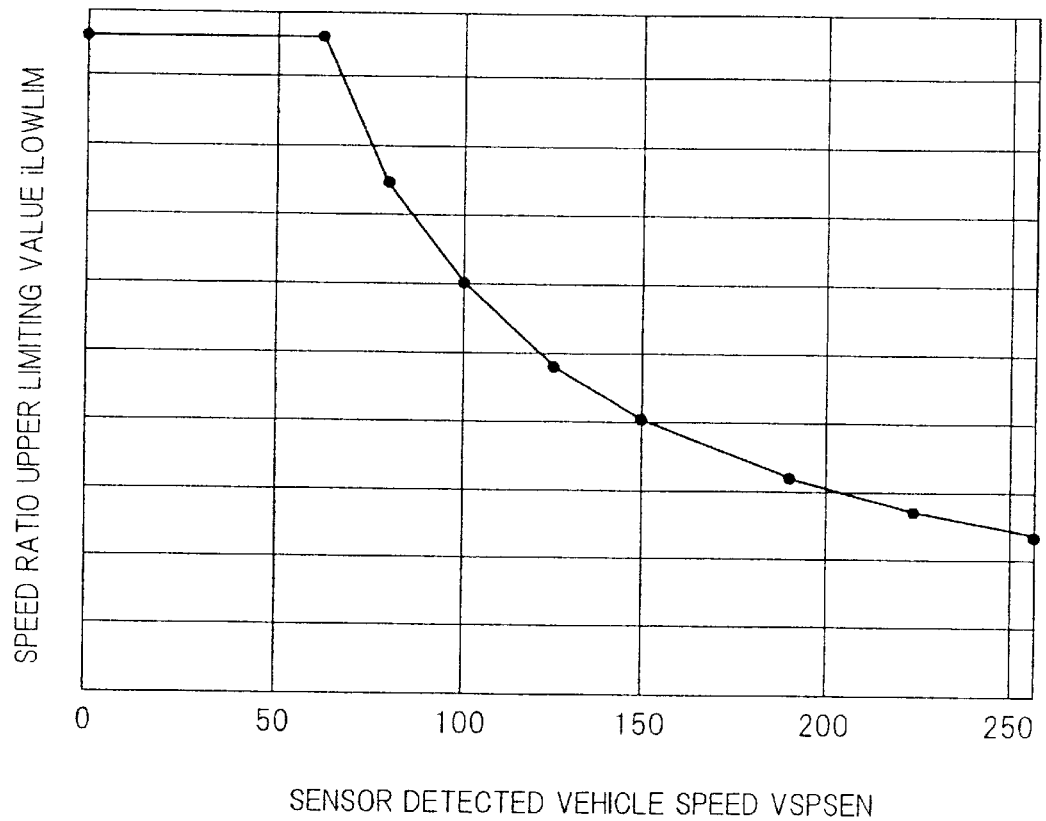
FIG. 8 is a map which specifies an upper limiting value of a final target ratio used for the speed change control.

Further, the map showing the relation between the sensor detected vehicle speed VSPSEN and speed ratio upper limiting value iLOWLIM is preset as shown in FIG. 8, so in the step S116, the speed ratio upper limiting value iLOW-LIM can be easily computed simply by looking up the map based on the sensor detected vehicle speed VSPSEN.

The map shown in FIG. 8 specifies a relation between the sensor detected vehicle speed VSPSEN and speed ratio upper limiting value iLOWLIM so that the upper value of the engine rotation speed Ne is a fixed value (for example, 5000 rpm).

Hence, when the final target ratio i* shifts while it is limited by the speed ratio upper limiting value iLOWLIM when the TCS 330 is operating, a speed change which makes the engine rotation speed Ne exceed the upper limiting value is not performed, and the engine rotation speed Ne is prevented from rising excessively.

This invention is not limited to the aforesaid embodiment For example, in the aforesaid embodiment, this invention is applied to a toroidal CVT, but it may also be applied to a V-belt CVT.

Further, although the final target ratio is computed after computing a final target input rotation speed based on the vehicle speed for speed ratio control, the a final target ratio may be computed directly from the vehicle speed for speed ratio control.

Moreover, although the final target ratio is limited by the speed ratio upper limiting value iLOWLIM, the same effect can be expected even if the final target input rotation speed is limited.

The entire contents of Japanese Patent Applications P11-280366 (filed Sep. 30, 1999) and P11-280362 (filed Sep. 30,1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A speed ratio control device for a vehicle comprising a continuously variable transmission and traction control system which controls a driving force, the device comprising:
    a sensor which detects a vehicle speed,
    an actuator which changes the speed ratio of the transmission, and
    a microprocessor programmed to:
        estimate a vehicle speed based on a running state,
        compute the target ratio of the transmission based on the sensor detected speed when the traction control system is not operating,
        compute the target ratio of the transmission based on the estimated vehicle speed, and limit the computed target ratio to a speed ratio upper limiting value computed based on the sensor detected vehicle speed, when the traction control system is operating, and
        control the actuator so that the speed ratio of the transmission approaches the target ratio.

2. A speed ratio control device as defined in claim 1, wherein the microprocessor is further programmed to:
    compute the speed ratio upper limiting value based on the sensor detected vehicle speed which is detected when the speed ratio upper limiting value is computed.

3. A speed ratio control device as defined in claim 1, wherein the microprocessor comprises:
    a map specifying a relation between the sensor detected vehicle speed and the speed ratio upper limiting value, and is further programmed to:
        compute the speed ratio upper limiting value by looking up the map.

4. A speed ratio control device as defined in claim 3, wherein the map specifies the relation between the sensor detection vehicle speed and the speed ratio upper limiting value so that an engine rotation speed is limited to less than a predetermined value.

5. A speed ratio control device for a vehicle comprising a continuously variable transmission and traction control system which controls a driving force, the device comprising:
    means for detecting a vehicle speed,
    an actuator which changes the speed ratio of the transmission,
    means for estimating a vehicle speed based on a running state,
    means for computing the target ratio of the transmission based on the sensor detected speed when the traction control system is not operating, means for computing the target ratio of the transmission based on the estimated vehicle speed, and limiting the computed target ratio to a speed ratio upper limiting value computed based on the sensor detected vehicle speed, when the traction control system is operating, and means for controlling the actuator so that the speed ratio of the transmission approaches the target ratio.

6. A method for controlling the speed ratio of a continuously variable transmission in a vehicle comprising the transmission and a traction control system, the method comprising:

detecting a vehicle speed;

estimating a vehicle speed based on a running state;

computing a target ratio of the transmission based on the detected vehicle speed when the traction control system is not operating;

computing the target ratio of the transmission based on the estimated vehicle speed, and limiting the computed target ratio to a speed ratio upper limiting value computed based on the estimated vehicle speed, when the traction control system is operating; and controlling the speed ratio of the transmission to approach the target speed ratio.

* * * * *